United States Patent [19]

Schweikart

[11] 3,829,719

[45] Aug. 13, 1974

[54] CONTACTLESS RELAY WITH A FIELD PLATE LOCATED IN THE MAGNETIC FIELD OF A CONTROL COIL

[75] Inventor: Horst Schweikart, Offenburg, Germany

[73] Assignee: GEHAP Gesellschaft fur Handel und Patentverwertung mbH & Co. KG, Sasbachwalden uber Achern, Germany

[22] Filed: July 24, 1972

[21] Appl. No.: 274,717

[30] Foreign Application Priority Data

July 23, 1971 Germany ........................... 2136941

Mar. 25, 1972 Germany ........................... 2214694

[52] U.S. Cl. ...................... 307/309, 328/5, 307/254

[51] Int. Cl. ........................................ H03k 17/00

[58] Field of Search ............... 307/309, 278, 254, 5

[56] References Cited

UNITED STATES PATENTS

| | | | |
|---|---|---|---|
| 3,518,459 | 6/1970 | Green | 307/309 |
| 3,652,878 | 3/1972 | Schmidt | 307/309 |
| 3,660,695 | 5/1972 | Schmitt | 307/309 |

*Primary Examiner*—L. T. Hix

*Attorney, Agent, or Firm*—Allison C. Collard

[57] ABSTRACT

A contactless relay having a least one magnetic field dependent resistor or field plate located in the range of the magnetic field of a control coil, and a control and stabilization winding disposed on the control coil and coupled to the magnetic resistor so that the contactless relay will operate reliably and repeatably over a wide temperature and frequency range.

7 Claims, 5 Drawing Figures

CONTACTLESS RELAY WITH A FIELD PLATE LOCATED IN THE MAGNETIC FIELD OF A CONTROL COIL

This invention relates to a contactless relay with a magnetic field-dependent resistor or field plate located in the magnetic field range of a control coil, with a transistor amplifier connected to the resisotr.

Contactless relays are already known in the prior art. They consist of a control circuit with a control coil, and a closing or opening circuit galvanically isolated from the control circuit, consisting essentially of a field plate that is located in a resistor bridge circuit. The connecting point of this bridge circuit is connected with a one or two stage transistor amplifier, whereby the last transistor stage effects the switching function depending on the excitation condition of the control coil. The magnetic field which acts on the field plate changes its resistance so as to cause the current in the bridge circuit to change, thus changing the potential at the base of the first transistor of the transistor amplifier.

Conventional contactless relays can, with good effect, be used for on and off switching operations of relatively long duration. In particular, they also can be used when the ambient temperature is maintained at a relatively constant level. However, when higher switching frequency are used, it has been found that conventional contactless relays have considerable disadvantages such as instability of the keying frequency, in particular during slight temperature changes.

This is caused by the fact that at increasing frequency, the reactance of the control winding of the coil increases, which causes the control current to decrease. As a result, the magnetic field required for the control of the field plate becomes weaker in the same measure as the control current decreases due to the increased frequency. With an increase in the switching frequency to 1 kHz, the inductive resistance of the control coil increases to more than 1,000 ohms, which causes a considerable weakening of the magnetic field.

However, in order to be able to use the weaker field to modulate the transistor amplifier over the field plate, it is necessary to continually adjust the operating point of the first transistor by changing the bridge resistance connected in series with the field plate. However, this adjustment can only be performed within narrow limits because with further increases in the switching frequency, the changes in the current caused by the weak changes in the magnetic field of the field plate are considerably less active than the changes in the current caused by slight changes in the temperature of the field plate. The field plate is very temperature sensitive so that it is practically impossible to trigger stable and perfect switching operations at higher frequencies.

The temperature dependence of the field plate, the increase of resistance of the control coil with increased switching frequency, and the weakening of the magnetic field limit the frequency range of conventional relays to a maximum of 2 kHz. Adjustment up to the cutoff frequency are also increasingly more difficult.

In the present invention, a contactless relay is provided which does not have the described disadvantages, and which can be used within a very wide frequency range of 0 – 50 kHz. In this invention, a contactless relay with a magnetic field dependent resistor (field plate) is located in the range of the magnetic field of a control coil with a transistor amplifier so that a control and stabilization winding is provided in the control coil and insulated therefrom, and connected in parallel to the field plate. The control and stabilization winding consists preferably of several electrically separate wire windings located on the control coil, and protected against excess voltage.

The contactless relay according to the invention has the great advantage in achieving a continuous transition of the switching frequency from 0 – 50 kHz, and greater, in an extremely stable manner. The contactless relay functions at long duration on and off switching operations with direct current applied to the control coil just as at higher frequencies of less than about 100 Hz are switched on only by means of the field plate, and the higher frequencies of about 100 Hz and up, by a combination of field plate control and direct pulse transmission. The transition of the function of the magnetic semiconductor to the pulse repeater can not be practically determined because the control and stabilization winding still forces the field plate into the correct key action in which it alone would no longer be able to execute correct switching operations. Furthermore, the temperature dependence is approximately stable in the indicated frequency range of 0 – 50 kHz, and is no longer critical. Temperature tests have shown that in a range of −40°C to +90°C, the relay functions very well without influencing the switching frequency. Only in shock tests was a slight change in the key conditions observed. Furthermore, the control and stabilization winding acts in a stabilizing manner on the keying ratio.

Moreover, circuits with pulse, sine, or sawtooth selections can be effected. Also the so-called lock-type or self-holding circuit can easily be designed with the contactless relay according to the invention. When NPN or PNP transistors are used as subsequent switching amplifiers, it is possible to operate a make or break contact.

In the drawings wherein similar reference characters denote similar elements throughout the several views.

Figure 1:
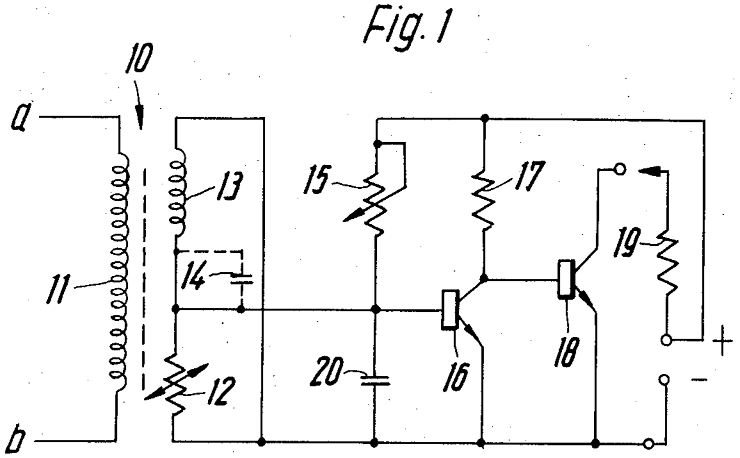
FIG. 1 shows in principle the circuit layout of the contactless relay according to the invention.

Referring to FIG. 1, the contactless relay according to the invention consists essentially of a control coil 10 with a control winding 11 and input connections *a* and *b*. In the magnetic field range of control coil 11, is located the magnetic field-dependent resistor or field plate 12. On control coil 11, there is a control and stabilization winding 13 which is connected in parallel with field plate 12. A condensor 14 is connected in series with winding 13. Condensor 14 however can also be eliminated as shown by the broken lines.

Field plate 12 has one terminal connected to a positive voltage source through an adjusting resistor 15, and the other terminal with the negative pole of the voltage source. The junction of resistor 15 and plate 12 joins the base of a transistor 16, the collector of which is connected via a resistor 17 with the positive pole of the voltage source and with the base of second transistor 18 in a usual linear amplifier circuit. The collector of switching transistor 18 leads to a relay terminal which is connected with the ballast resistor 19. Resistor 19 is connected to the positive voltage. Field plate 12 is by-passed by a condensor 20.

When a direct current is connected to points *a* and *b*, a magnetic field builds up in coil 10 which causes a change in the resistance of field plate 12, which is located within the coil. The pulse in winding 13 which occurs simultaneously with the switching-on moment, only causes a short on-off switching of the relay. Winding 13 is therefore, at frequencies below 50 Hz, only to be considered as a compensation winding of field plate 12, whereby for greater temperature changes of the ambient temperature, the change of the temperature of the field plate is favorably compensated.

The operating point of transistor 16 is so adjusted by means of voltage divider 15 that transistor 16 connects through when the resistance of the field plate 12 increases. This correspondingly operates transistor 18 and ballast resistor 19. This operation holds good for even the lowest frequencies.

With an increasing switching frequency, the reactance of coil winding 11 increases so that for an increase in switching frequency to 1 kHz, the resistance of coil 11 rises to about 1,300 ohms. This considerably weakens the magnetic field for the control of field plate 12. Through this action resistor 15 would, without compensation winding 13, have to be constantly adjusted. With the parallel connection of the control and stabilization winding, a heterodyning phenomenon occurs at higher frequencies which gradually decreases the control effect of the field plate, and correspondingly increases the control effect of the control and stabilization winding 13. When a frequency is reached where the field plate no longer functions, coil 13 takes full control of the circuit. It has surprisingly been found that the transfer is entirely smooth and practically homogenous. It was further found that changes in the ambient temperature do not affect the frequency, the keying conditions, or the stability of the relay. This independence to temperature is practically non-critical at 0 – 50 kHz.

Further, square wave, sine, and sawtooth wave circuits can be triggered without changes in the pulse. Further, a so-called lock type or self-holding circuit can be constructed without any difficulty.

Figure 2:
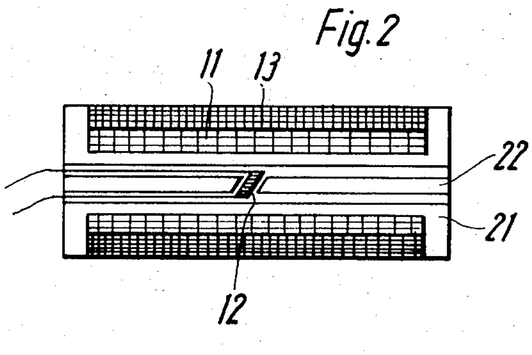
FIG. 2 shows a preferred embodiment of the construction of the contactless relay according to the invention.

FIG. 2 illustrates the construction of the contactless relay according to the invention. Control coil 11 is wound on a coil body 21. In the inner space or core of the coil, field plate 12 is located between two yokes 22, and in a usual manner, connected to a printed or integrated circuit. Control and stabilization winding 13 is wound on coil 11. The number of windings of winding 13 corresponds to the given conditions. The winding is so large that it does not appreciably influence the inner resistance of the field plate.

It is, of course, possible to use the relay shown in FIGS. 1 and 2 in multiples in order to execute several control functions simultaneously, or one after the other.

Figure 3:
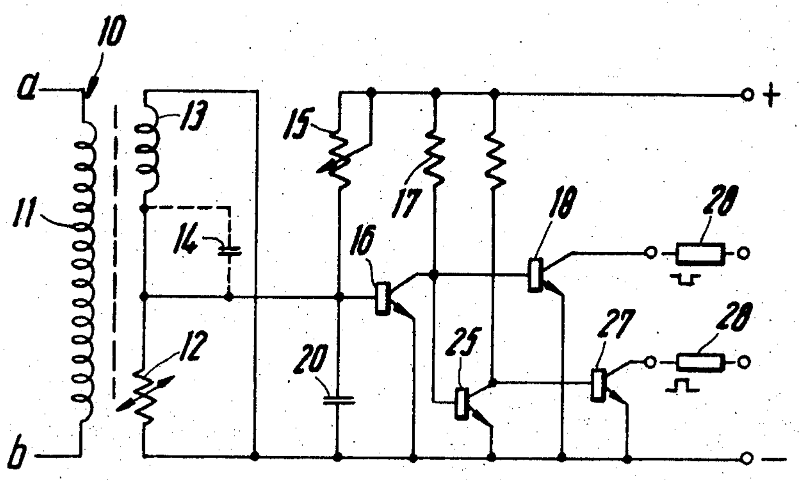
FIG. 3 shows a circuit layout for a contactless relay with a variable function.

In FIG. 3 transistors 18 and 25 have their bases connected in parallel with the collector circuit of transistor 16. Transistor 18 functions in the same manner as in the circuit layout according to FIG. 1. A further transistor 26 is connected to the output of transistor 27 to reverse the conductance condition. Thus, when transistor 25 is non-conducting, transistor 27 is conducting, through which the two ballast resistances 28 are successively switched on and off, depending on whether coil 11 has been actuated.

Figure 4:
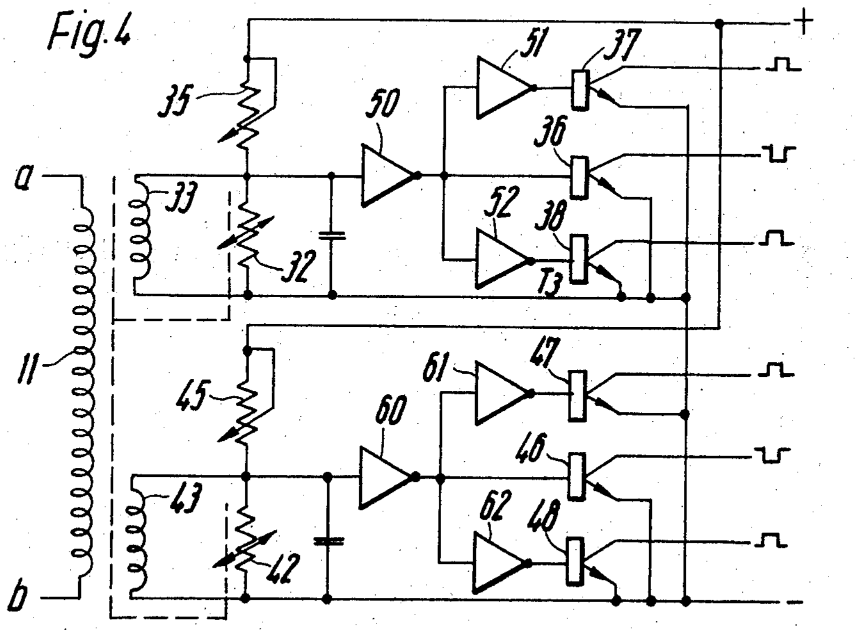
FIG. 4 shows a circuit layout with two field plates, and four closing and two opening functions.

FIG. 4 shows a layout with two field plates 32 and 42 and two control and stabilization windings 33 and 43, which are on coil 11, and are insulated therefrom. The junctions of resistor 35 and plate 32, and resistor 45 and plate 42 are connected to the input of inverter steps 50 and 60, respectively. The outputs of these inverter steps are connected to the bases of transistors 36 and 46, respectively. Furthermore, the outputs are also connected in parallel with the inputs of two further pairs of inverter steps 51, 52, and 61, 62, respectively. The outputs of these inverter steps are connected to the bases of the transistors 37, 38, 47 and 48. The pulse is reversed through first inverter steps 50 and 60 so that it acts as a negative pulse (as shown) on the output of transistors 36 and 46. The paired inverter steps 51, 52 and 61, 62 connected in parallel, take care of a further reversal of the pulses, so that positive pulses are produced at the outputs of transistors 37, 38 47 and 48. These positive pulses correspond to four closing functions, while the two negative pulses correspond to two opening functions.

Figure 5:
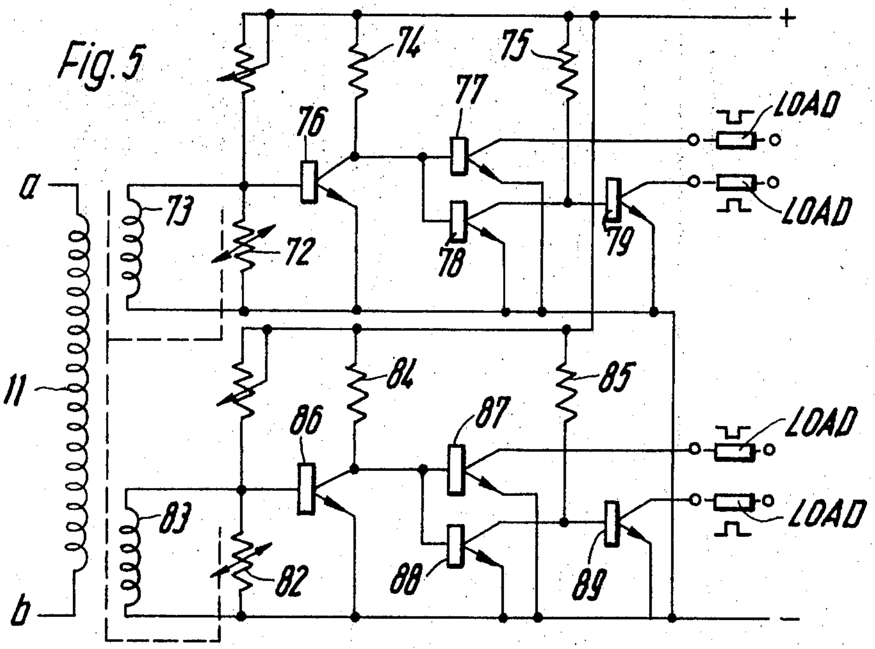
FIG. 5 shows a circuit layout with two field plates, and two opening and two closing functions.

FIG. 5 shows a circuit layout of the contactless relay according to the invention with two opening and two closing functions. In this embodiment, two field plates 72 and 82 are located in the magnetic field range of the core of coil 11. The field plates are connected to two control and stabilization windings 73 and 83. The circuit layout for each field plate corresponds to the already described circuit layout of FIG. 3 with transistors 76, 77, 78 and 79 which are so connected that at the outputs of transistors 77 and 79, alternating pulses occur which correspond to an opening and closing function. The second field plate is connected to a transistor circuit that is exactly the same, consisting of transistors 86, 87, 88 and 89 as well as with the resistors 84 and 85. This causes alternating pulses to occur at the collectors of the transistors 87 and 89 which in turn correspond to an opening and a closing function.

The opening and closing functions can of course be extended or combined, according to the tasks which the relay according to the invention has to carry out.

While only a few embodiments of the present invention have been shown and described, it will be obvious to those persons skilled in the art that many changes and modifications may be made thereunto without departing from the spirit and scope of the invention.

What is claimed is:

1. A contactless relay comprising:

a control coil for producing a magnetic field in response to an input signal;

at least one control and stabilization winding disposed in the magnetic field of the control coil and electrically insulated from the control coil, said winding compensating for changes in the reactance of the control coil for temperature and frequency changes;

magnetic field dependent resistor means disposed in the magnetic field of the control coil and connected in parallel to said at least one control and stabilization winding; and at least one amplifier electrically connected to said at least one control and stabilization winding and resistor means, said amplifier producing at its output a signal responsive to the input signal applied to the control coil.

2. The contactless relay according to claim 1, wherein said first amplifier comprises at least one transistor amplifier, second and third transistor amplifiers connected to the output of said first transistor amplifier, and a fourth transistor amplifier connected to the output of said third transistor amplifier so that a pulse output on said fourth transistor amplifier is opposite in polarity from the output of said second transistor amplifier.

3. The contactless relay according to claim 1, wherein a second control and stabilization winding is disposed on the control coil coupled to a second magnetic field dependent resistor, and further comprising first pulse inverter means coupled to each of said control and stabilization windings, second and third pulse inverter means coupled in parallel to each of said first inverter means, first transistor amplifier means coupled to each of said second and third inverter means, and second transistor amplifier means coupled to each of said first inverter means so that the outputs of said first and second transistor means provide a plurality of closing and opening relay signals, respectively.

4. The contactless relay according to claim 1, wherein a second control and stabilization winding is disposed on the control coil and coupled to a second magnetic field dependent resistor, said at least one amplifier comprising first transistor amplifier means coupled to each of the magnetic field dependent resistors, second and third transistor amplifier means coupled in parallel to each of said first transistor amplifier means, fourth transistor amplifier means coupled to each of said third transistor amplifier means so that the output of each of said fourth and second amplifier means provides at least two closing and two opening relay signals respectively.

5. The contactless relay according to claim 1, wherein additionally comprising load resistance coupled to the output of said amplifier means, said load resistance matching the output impedance of said amplifier means.

6. The relay as recited in claim 1 wherein said at least one amplifier comprises:

a first amplifier coupled to the output of the magnetic field dependent resistor; and a second amplifier coupled in parallel with said first amplifier for providing at the output of said amplifiers a plurality of opening and closing relay signals.

7. The relay as recited in claim 6 additionally comprising a plurality of inverter amplifiers coupled to the output of said first and second amplifiers for providing a plurality of opening and closing relay signals.

* * * * *